US011899419B2

(12) United States Patent
Hsu et al.

(10) Patent No.: US 11,899,419 B2
(45) Date of Patent: Feb. 13, 2024

(54) INTEGRATED CONTROL MANAGEMENT SYSTEM

(71) Applicant: MITAC COMPUTING TECHNOLOGY CORPORATION, Taoyuan (TW)

(72) Inventors: Heng-Chia Hsu, Taoyuan (TW); Chen-Yin Lin, Taoyuan (TW); Yu-Shu Yeh, Taoyuan (TW); Chien-Chung Wang, Taoyuan (TW); Chin-Hung Tan, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 176 days.

(21) Appl. No.: 17/524,384

(22) Filed: Nov. 11, 2021

(65) Prior Publication Data

US 2022/0163937 A1 May 26, 2022

(30) Foreign Application Priority Data

Nov. 26, 2020 (TW) .................................. 109141662

(51) Int. Cl.
*G05B 19/042* (2006.01)
(52) U.S. Cl.
CPC ............ *G05B 19/0426* (2013.01); *G05B 2219/23027* (2013.01)
(58) Field of Classification Search
CPC ...... G05B 19/0426; G05B 2219/23027; G06F 15/00
See application file for complete search history.

(56) References Cited

U.S. PATENT DOCUMENTS

2001/0002193 A1* 5/2001 Fourie ............... H04Q 11/0478
370/360
2021/0103387 A1* 4/2021 Vanninen ............... G06F 3/061

OTHER PUBLICATIONS

Zhu, L., & Yu, L. (2018). A design of decentralized dual mode redundant hot standby arbitration switch-over logic and Architecture. 2018 International Conference on Electronics Technology (ICET). https://doi.org/10.1109/eltech.2018.8401458 (Year: 2018).*

* cited by examiner

*Primary Examiner* — Thomas C Lee
*Assistant Examiner* — Tyler Dean Hedrick
(74) *Attorney, Agent, or Firm* — RABIN & BERDO, P.C.

(57) ABSTRACT

An integrated control management system includes an input output device. The input output device includes a database, a memory module, a first processing module, and a second processing module. The memory module receives and stores a plurality of integrated control commands, and one of the integrated control commands is generated based on a hardware control command for setting a hardware control transmitted by another input and output device. The first processing module reads the integrated control command from the memory module and obtains the hardware control data from the integrated control command. The first processing module updates the hardware control data to the database. The second processing module reads the database and updates the hardware control data stored in the database to another database in another input output device. The second processing module sets the hardware control based on the hardware control data stored in the database.

16 Claims, 4 Drawing Sheets

INTEGRATED CONTROL MANAGEMENT SYSTEM

CROSS-REFERENCE TO RELATED APPLICATION

This non-provisional application claims priority under 35 U.S.C. § 119(a) to Patent Application No. 109141662 in Taiwan, R.O.C. on Nov. 26, 2020, the entire contents of which are hereby incorporated by reference.

BACKGROUND

Technical Field

The instant disclosure relates to an integrated control management system.

Related Art

For servers, the input/output module (TOM) is connected to the computer device and the hardware apparatus through a host bus adapter (HBA) to construe a message passage. One input/output module may be connected to one computer device and one hardware apparatus, or plural input/output modules may be connected to plural computer devices and plural hardware apparatuses.

SUMMARY

In the case that a plurality of input/output modules is controlled by a computer device at the same time so that the input/output modules control a hardware apparatus at the same time, because the hardware apparatus receives a plurality of control commands from two or more input/output modules, the determination function of the hardware apparatus is interfered by the control commands. As a result, the hardware apparatus may be operated improperly, thereby causing instability among the input/output modules and the hardware apparatus, and thus damaging the hardware apparatus. Moreover, the input/output modules are operated individually. Therefore, when one of the input/output modules is damaged, another one of the input/output modules is able to take over the damaged input/output module. Nevertheless, owing to the system architecture known to the inventor, the input/output modules are, in an individual manner, communicationally connected to the computer device and the hardware apparatus to perform communications or to receive the control command. Therefore, when one of the input/output modules is damaged, rest of the input/output modules do not realize the control command received by the damaged input/output module before the damaged input/output module is damaged. As a result, rest of the input/output modules cannot completely replace the damaged input/output module to allow the hardware apparatus to operate properly.

In some embodiments, an integrated control management system is adapted to control a hardware and comprises an input output device. The input out device comprises a database, a memory module, a first processing module, and a second processing module. The memory module is adapted to receive and store a plurality of integrated control commands. One of the integrated control commands is a hardware control command for setting the hardware control transmitted by another input output device. The first processing module is coupled to the memory module and the database. The first processing module is adapted to read the hardware control command of the integrated control commands from the memory module to obtain a hardware control data from the hardware control command. The first processing module updates the hardware control data to the database. The second processing module is coupled to the database. The second processing module is adapted to read the database and update the hardware control data stored in the database to another database of the another input output device. The second processing module sets the hardware control based on the hardware control data stored in the database.

In some embodiments, an integrated control management system is adapted to set a hardware control and comprises an input output device. The input output device comprises a database, a memory module, a first processing module, and a second processing module. The memory module is adapted to receive and store a plurality of integrated control commands. One of the integrated control commands is a hardware control command for setting the hardware control transmitted by a controller. The first processing module is coupled to the memory module and the database. The first processing module is adapted to read the hardware control command of the integrated control commands to obtain a hardware control data from the hardware control command. The first processing module updates the hardware control data to the database. The second processing module is coupled to the database. The second processing module is adapted to read the database and update the hardware control data stored in the database to another database of the another input output device. The second processing module sets the hardware control based on the hardware control data stored in the database.

In some embodiments, an integrated control management system is adapted to set a hardware control. The integrated control management system comprises an input output device and another input output device. The input output device comprises a database, a memory module, a first processing module, a second processing module, and a third processing module. The memory module is adapted to receive and store a plurality of integrated control commands. One of the integrated control commands is a hardware control command. The first processing module is couped to the memory module and the database. The first processing module is adapted to read the hardware control command of the integrated control commands to obtain a hardware control data from the hardware control command. The first processing module updates the hard control data to the database. The second processing module is coupled to the database. The second processing module is adapted to read the database and transmit the hardware control data. The second processing module sets the hardware control based on the hardware control data. The third processing module is coupled to the memory module. The third processing module is adapted to receive the hardware control command and transmit the hardware control command to the memory module. The another input output device comprises another database, a fourth processing module, another memory module, and a fifth processing module. The fourth processing module is adapted to receive the hardware control command from a controller and transmit the hardware control command to the third processing module. The third processing module stores the hardware control command in the memory module. The another memory module is coupled to the fourth processing module. The another memory module is adapted to store the hardware control data transmitted by the second processing module as a plurality of integrated control commands of the another memory module. One of the integrated control commands of the another memory module is the hardware control data. The fifth processing module is coupled to the another memory module. The fifth processing module is adapted to read the hardware control data from the another memory module. The fifth processing module updates the hardware control data to the another database.

In some embodiments, a fourth processing module of the another input output device receives the hardware control command and transmits the hardware control command to the third processing module; the third processing module stores the hardware control command to an assigned address of the memory module, and the first processing module reads the hardware control command of the integrated control command from the memory module based on the assigned address.

In some embodiments, the third processing module and the fourth processing module are representational state transfer application program interfaces.

In some embodiments, the second processing module periodically sets the hardware control based on a preset time and the hardware control data stored in the database.

In some embodiments, the second processing module periodically updates the hardware control data stored in the database to another database of the another input output device based on the preset time.

In some embodiments, the memory module is a virtual memory.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
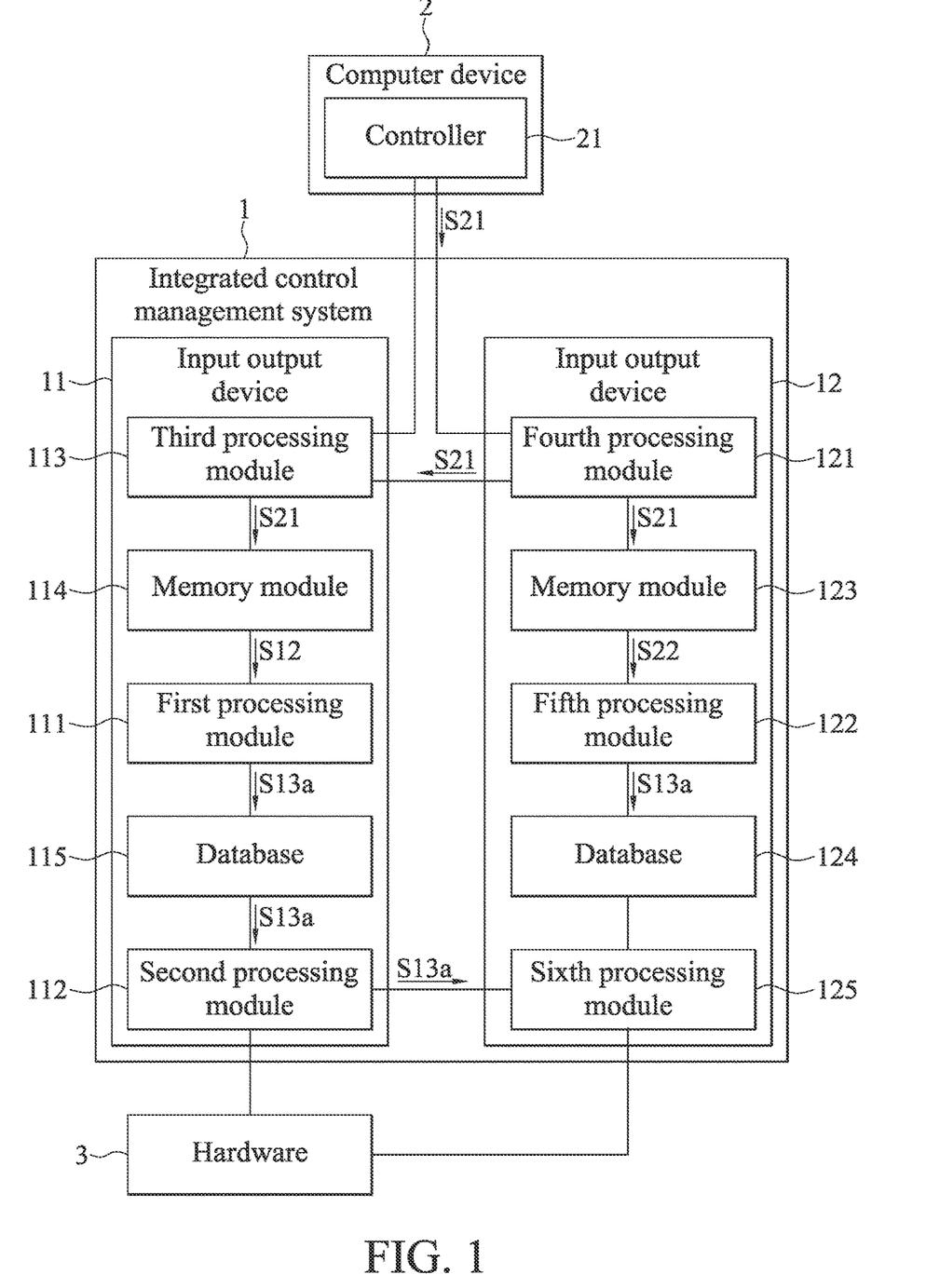
FIG. 1 illustrates a schematic view of an input output device of an integrated control management system according to an exemplary embodiment of the instant disclosure.
Figure 2:
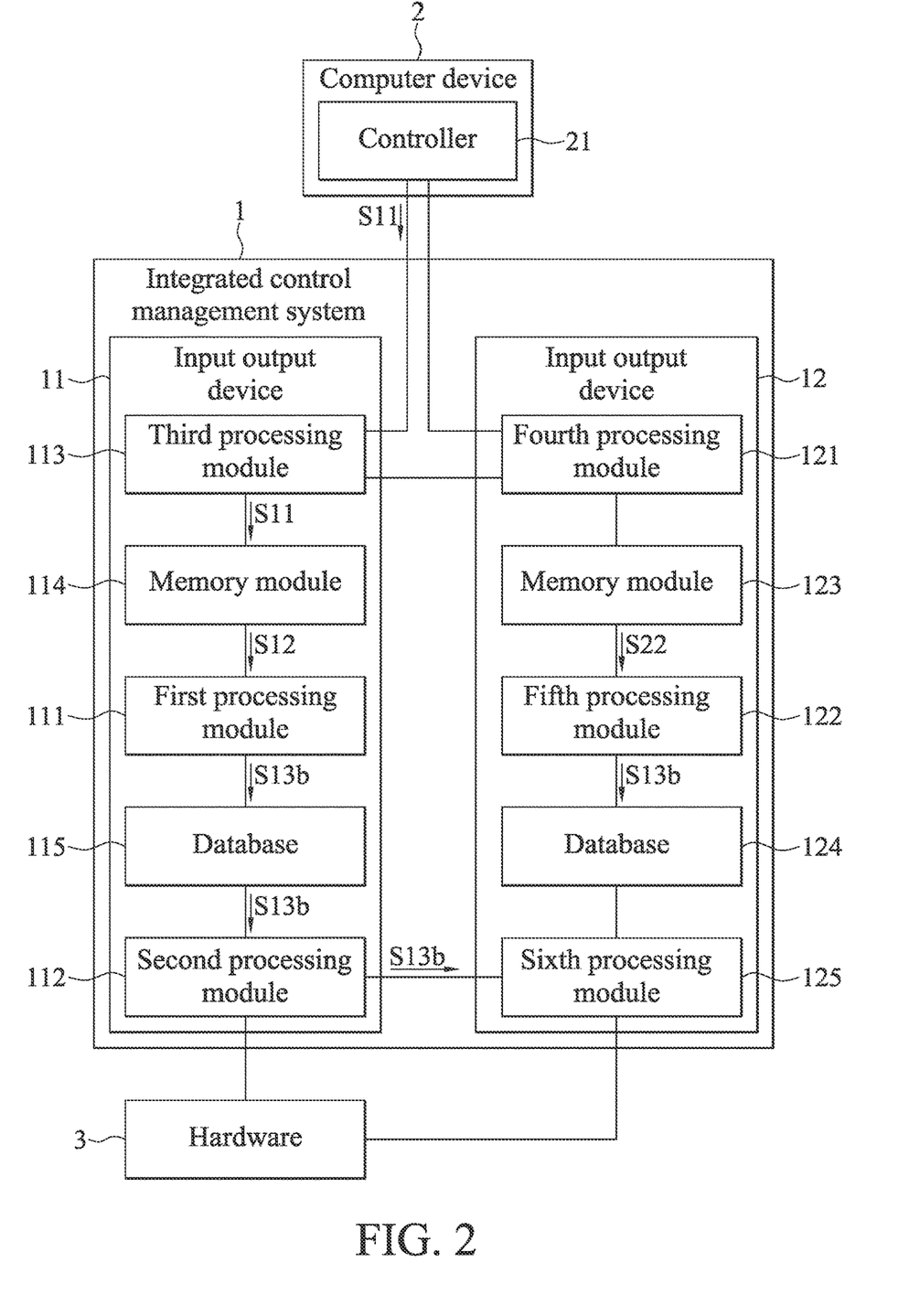
FIG. 2 illustrates a schematic view of an input output device of an integrated control management system according to another exemplary embodiment of the instant disclosure.

Please refer to FIG. 1 and FIG. 2. FIG. 1 and FIG. 2 respectively illustrate schematic views of an input output device of an integrated control management system 1 according to an exemplary embodiment and another exemplary embodiment of the instant disclosure. In this embodiment, the integrated control management system 1 comprises a plurality of input output devices 11, 12. The input output devices 11, 12 are connected to the computer device 2 and the hardware 3, respectively. The input output devices 11, 12 could be a circuit board, a server, a computer module or an independent electronic module. A user can operate the computer device 2 and control the hardware 3 through any one of the input output devices 11, 12. Based on the scheduling of the computer device 2, the instruction the computer device 2 received from the internet, the execution of software or firmware of the computer device 2, or certain messages transmitted by the component of the computer device 2, the computer device 2 may be triggered to transmit a control command, so that the computer device 2 controls the input output devices 11, 12 and/or the hardware 3 through the input output devices 11, 12. The input output devices may be classified as an active type or a passive type. These two types of input output devices perform operations individually. Moreover, the active type input output device is adapted to control the hardware, and the passive type input output device is adapted to back up the data stored in the active type input output device. In the following paragraphs, a system having one active type input output device 11 and one passive type input output device 12 is taken as an example. The computer device 2 may transmit a control command to any one of the input output devices 11,12. The input output device 11 controls the input output device 11 itself, the input output device 12, or the hardware 3 based on the control command received by the input output device 11 or the input output device 12. Therefore, the input output device 11 itself, the input output device 12, or the hardware 3 executes a corresponding operation. The input output device 11 transmits a control data stored in the input output device 11 to the input output device 12 for back up. The computer device 2 may be a server, a tablet computer, or a personal computer. The hardware 3 may be a solid-state disk (SSD), a light-emitting diode (LED) lamp, a fan, or other peripheral hardware apparatuses.

As shown in FIG. 1 and FIG. 2, the input output device 11 executes a firmware so as to be operated as an active type input output device, and the input output device 12 executes another firmware so as to be operated as a passive type input output device. (In another embodiment, the input output device 11, 12 execute the same firmware with different configuration) The input output device 11 comprises a plurality of processing modules (hereinafter, a first processing module 111, a second processing module 112, and a third processing module 113), a memory module 114, and a database 115. The first processing module 111 is coupled to the memory module 114, and the database 115 is coupled to the first processing module 111 and the second processing module 112. That is, in this embodiment, the first processing module 111 is coupled between the memory module 114 and the database 115. The input output device 12 comprises a database 124. In some embodiments, the first processing module 111, the second processing module 112, and the third processing module 113 may be together implemented by a management controller (e.g. a Board Management Controller (BMC)) of the input output device 11. The memory module 114 may be disposed in the management controller or externally connected to the management controller, and the database 115 may be externally connected to the management controller. In one embodiment, the input output device 11 or the input output device 12 is defined as an active type input output device while a management controller in the input output device 11 or the input output device 12 is operated as an active type management controller. In one embodiment, a firmware of the management controller is divided into a plurality of threads. The plurality of threads could be executed by the management controller at the same time or at different times. In this embodiment, the management controller in an input output device executes a first thread of a firmware, so that the management controller is defined as the first processing module 111; the management controller in the input output device executes a second thread of the firmware, so that the management controller is defined as the second processing module 112. Therefore, the phrase "coupled to" is not limit to a physical connection, and may be interpreted as an interaction/communication between the threads or between the thread and the memory.

Figure 3:
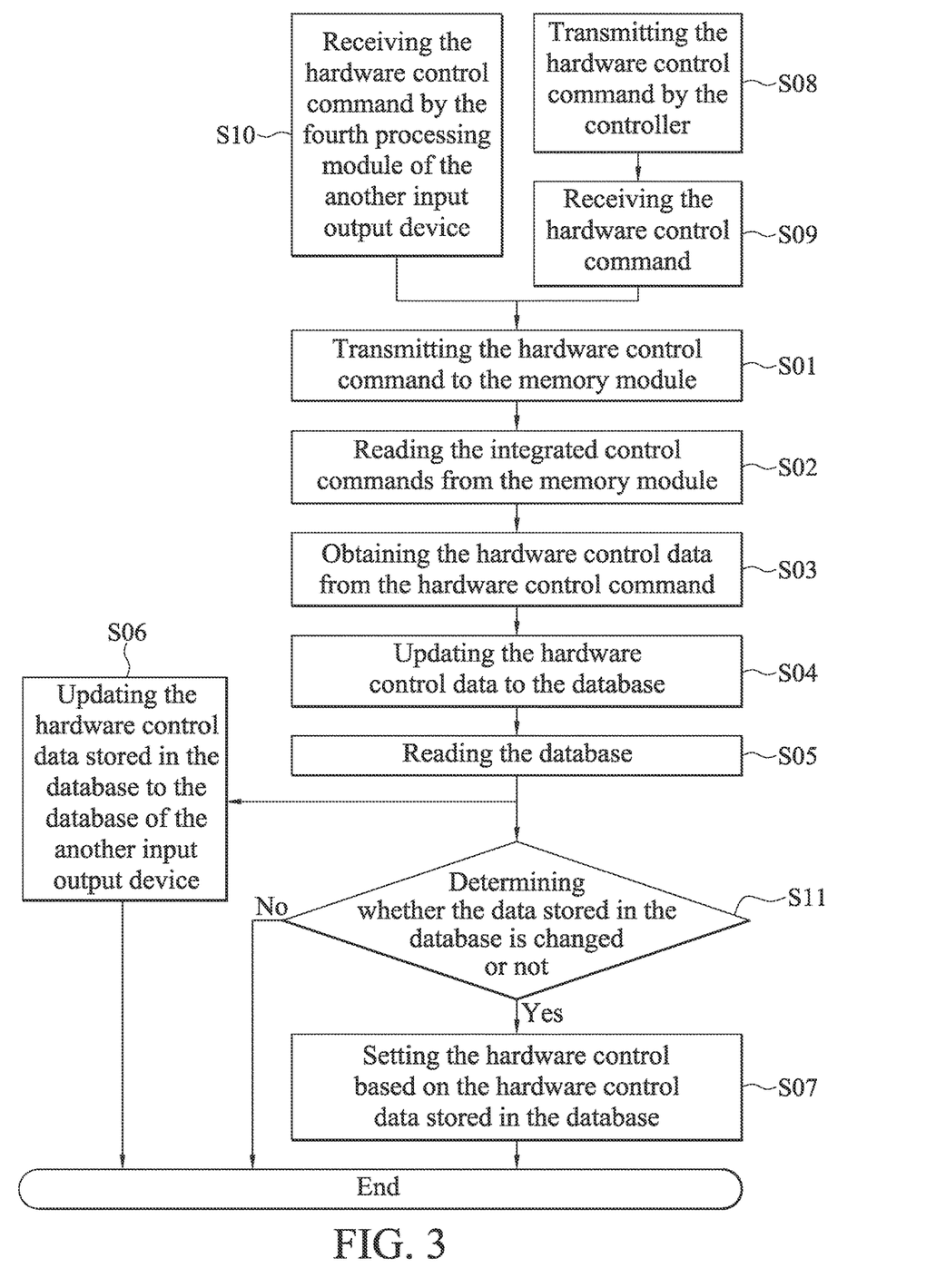
FIG. 3 illustrates a flowchart of an input output device of an integrated control management system according to the exemplary embodiment of the instant disclosure.

Please refer to FIG. 3. FIG. 3 illustrates a flowchart of an input output device of an integrated control management system 1 according to the exemplary embodiment of the instant disclosure. As shown in FIG. 1 and FIG. 3, when the database 115 has not been updated, the database 115 stores a default hardware control data for setting the hardware 3 in advance. The hardware control data comprises a setting parameter. The input output device 11 receives a hardware control command S21 transmitted by the input output device 12. The hardware control command S21 is generated and is transmitted by the computer device 2 to the input output device 12, and is a control command for setting a control of the hardware 3. The input output device 11 sequentially accumulates and stores the hardware control command S21 in the memory module 114 (step S01) as one integrated control command S12 of the plurality of integrated control commands S12 stored in the memory module 114. Based on the time of the hardware control command S21 is generated or the time the hardware control command S21 is received by the input output device 11, the input output device 11 sequentially accumulates and stores the hardware control command S21 in a control command list comprising the plurality of integrated control commands S12. In one embodiment, the control command list stored in the memory module 114 may be received from the computer device 21 through the third processing module 113 or the input output device 12. The first processing module 111 reads the control command list from the memory module 114 and executes the plurality of integrated control commands S12 in the control command list (step S02). The plurality of integrated control commands S12 at least comprises an integrated control command S12 corresponding to the hardware control command S21. The integrated control command S12 corresponding to the hardware control command S21 comprises a setting parameter for a hardware control data S13a of the hardware control command S21. The first processing module 111 obtains at least the hardware control data S13a from the plurality of integrated control commands S12 (step S03). Furthermore, the first processing module 111 transmits the hardware control data S13a to the database 115 and stores the hardware control data S13a in the database 115, so that the first processing module 115 updates the default hardware control data or the previously updated hardware control data in the database 115 (step S04). In other words, in this embodiment, after the first processing module 111 transmits the hardware control data S13a to the database 115 and stores the hardware control data S13a in the database 115, based on the hardware control data S13a, the first processing module 111 overwrites the setting parameter stored in the database 115, where the setting parameter is related to the hardware control data for setting the hardware 3. For example, the setting parameter may be a setting parameter stored in the database 115 in advance and related to the hardware control data for setting the hardware 3, or the setting parameter may be a setting parameter of the hardware control data overwritten and stored in the database 115 by the first processing module 111 in the previous update procedure. Therefore, after the first processing module 111 updates the database 115, the hardware control data S13a replaces the respected setting parameter of the hardware control data which is stored in the database 115 in advance or the hardware control data overwritten and stored in the database 115 by the first processing module 111 in the previous update procedure.

After the first processing module 111 updates the hardware control data S13a to the database 115, the second processing module 112 reads the database 115 to obtain a plurality of hardware control data currently stored in the database 115, where the plurality of hardware control data comprises setting parameters. The setting parameters of the plurality of hardware control data currently stored in the database 115 comprise the setting parameter of the hardware control data S13a (step S05). The second processing module 112 transmits the plurality of hardware control data which comprises the setting parameters and which is currently stored in the database 115, so that the input output device 12 stores the setting parameters of the plurality of hardware control data in the database 124 of the input output device 12 to update the setting parameter of the hardware control data related to the hardware 3 in the database 124. Moreover, the first processing module 111 stores the setting parameter of the hardware control data S13a in the database 115, so that the input output device 12 stores the hardware control data S13a comprising the setting parameter in the database 124 of the input output device 12 (step S06). In other words, in this embodiment, after the database 124 is updated, the data related to the hardware 3 which is stored in the database 124 is the same as the data related to the hardware 3 which is stored in the database 115, and both the database 115 and the database 124 comprise the hardware control data S13a, so that the database 124 executes the data backup procedure with the data in the database 115. Moreover, after the second processing module 112 executes the step S05, the second processing module 112 sets the control of the hardware 3 based on the hardware control data S13a stored in the database 115, so that the hardware 3 operates based on the setting parameter (step S07). In one embodiment, the data related to the hardware 3 which is stored in the database 124 is the same as the data related to the hardware 3 which is stored in the database 115 before the database 124 is updated; therefore, the setting parameters stored in the database 124 and database 115 is kept the same after the hardware control data S13a is updated.

In another embodiment, as shown in FIG. 2 and FIG. 3, a difference between the input output devices 11, 12 in FIG. 2 and the input output devices, 12 11 in FIG. 1 is that, in FIG. 1, the input output device 11 receives the hardware control command S21 transmitted by the input output device 12, and in FIG. 2, the input output device 11 receives a hardware control command S11 transmitted by the computer device 2. Specifically, in this embodiment, before performing any update procedure, the database 115 of the input output device 11 stores a default hardware control data for setting the hardware 3 in advance. The hardware control data comprises setting parameters. The computer device 2 comprises a controller 21. The controller 21 transmits a hardware control command S11 to the input output device 11 (step S08). The hardware control command S11 is a control command for setting the control of the hardware 3. The input output device 11 receives the hardware control command S11 (step S09). After the step S09 is executed, the input output device 11 then executes the steps S01 to S07 based on the hardware control command S11 to store the hardware control command S11 in the memory module 114, and then the input output device 11 accumulates and stores the hardware control command S11 in the control command list comprising a plurality of integrated control commands S12 as one integrated control command S12 of the plurality of integrated control commands S12. In other words, in this embodiment, the plurality of integrated control commands S12 stored in the memory module 114 at least comprises an integrated control command S12 corresponding to the hardware control command S11 and may further comprise the integrated control command S12 corresponding to the hardware control command S21. The hardware control command S21 comprises the hardware control data S13a. In other words, in this embodiment, the integrated control command S12 corresponding to the hardware control command S21 also comprises the hardware control data S13a. Next, the first processing module 111 reads the integrated control command S12 which is stored in the memory module 114 and corresponding to the hardware control command S11, and the first processing module 111 obtains a hardware control data S13b from the integrated control command S12 so as to update the hardware control data S13b to the database 115 correspondingly. The second processing module 112 obtains the hardware control data S13b stored in the database 115 and updates the hardware control data S13b to the input output device 12, so that the input output device 12 stores the hardware control data S13b in the database 124. Therefore, the data, which is related to the hardware 3, in the database 115 is backed up to the database 124. The second processing module 112 further sets the hardware 3 based on the setting parameter of the hardware control data currently stored in the database 115. For example, the second processing module 112 sets the hardware 3 with the hardware control data S13b to control the hardware 3, so that the hardware 3 operates based on the setting parameter of the hardware control data S13b currently stored in the database 115.

Accordingly, when the input output device 11 executes a firmware and operates as an active type input output device, whether the user transmits the hardware control command to the input output device 11 or to the input output device 12, the user can control the operation of the hardware 3 with the integrated control commands S12 stored in the memory module 114 through the input output device 11, where the control commands transmitted to the input output device 11 and/or the input output device 12 are integrated to form the integrated control commands S12, and the user can back up the hardware control data S13a, S13b corresponding to the integrated control commands S12 in the input output device 12. Therefore, through the cooperation of the input output devices 11, 12, the hardware 3 can be prevented from receiving different setting parameters related to the hardware control data S13a, S13b for controlling the hardware 3 transmitted by the input output device 11 and the input output device 12 at the same time, which will cause the setting of the hardware 3 to be improper and unstable and thus even cause the hardware 3 to be damaged. Moreover, the input output device 12 can perform the backup procedure. Therefore, in the case that the input output device 11 served as the active type input output device cannot operate and the input output device 12 detects that the input output device 11 cannot operate, the input output device 12 is automatically switched to be operated as an active type input output device, and the input output device 12 replaces the input output device 11 with the hardware control data S13a, S13b which is backed up to the input output device 12. Hence, the input output device 12 takes over the input output device 11 to execute the control of the hardware 3.

In some embodiments, as shown in FIG. 1 to FIG. 3, the controller 21 may transmit another hardware control command (hereinafter, hardware control command S11) to the input output device 11 after the controller 21 transmits the hardware control command S21 to the input output device 12. In other words, in this embodiment, the input output device 11 receives the hardware control command S21 transmitted by the input output device 12, and the input output device 11 executes the steps S01 to S07 based on the hardware control command S21 to update the hardware control data S13a obtained from the hardware control command S21 to the database 115. The hardware control data S13a overwrites the hardware control data originally stored in the database 115, and the input output device 11 backs up the hardware control data S13a to the database 124. Moreover, the second processing module 112 sets the control of the hardware 3 based on the hardware control data S13a stored in the database 115. Furthermore, after the controller 21 transmits the hardware control command S21 to the input output device 12, the controller 21 transmits the hardware control command S11 to the input output device 11, and the input output device 11 transmits the hardware control command S11 to the memory module 114 to execute the steps S08 and S09. The input output device 11 executes the steps S01 to S07 again based on the hardware control command S11. Therefore, based on the generated times of the hardware control command S11 and the hardware control command S21, the input output device 11 sequentially accumulates and stores the hardware control command S11 and the hardware control command S21 in the memory module 114, and the hardware control command S11 and the hardware control command S21 are further integrated as a control command list comprising a plurality of integrated control commands S12 which are listed based on the generated times of the commands. In this embodiment, the hardware control command S21 is generated earlier than the hardware control command S11. Therefore, after the first processing module 111 reads and executes the integrated control command S12 corresponding to the hardware control command S21, the first processing module 111 then reads the integrated control command S12 stored in the memory module 114, where the integrated control command S12 corresponds to the hardware control command S11, and the first processing module 111 obtains the hardware control data S13b from the integrated control command S12 and updates the hardware control data S13b to the database 115. Moreover, the second processing module 112 obtains the hardware control data S13b from the database 115 and updates the hardware control data S13b to the input output device 12, so that the hardware control data S13b is backed up and stored in the database 124, and thus the backup procedure for the data in the database 115 is achieved. In the case that the hardware control data S13b and the hardware control data S13a are related to setting parameters of a same function of the hardware 3 and a same control object, then the hardware control data S13b overwrites the hardware control data S13a stored in the database 115 and the database 124, and the hardware control data S13b is updated to replace the hardware control data S13a in the database 115 and the database 124. In the case that the hardware control data S13b and the hardware control data S13a are related to setting parameters of different functions of the hardware 3 or different control objects, then the hardware control data S13b and the hardware control data S13a are together stored in the database 115 and also stored in the database 124. The second processing module 112 sets the control of the hardware 3 based on the hardware control data S13b stored in the database 115 to control the hardware 3 to operate based on the setting.

In some embodiments, as shown in FIG. 1, the controller 21 may transmit the hardware control command S11 to the input output device 11 before the controller 21 transmits the hardware control command S21 to the input output device 12. In other words, in this embodiment, the controller 21 of the computer device 2 executes the steps S08 and S09 based on the hardware control command S11, and the input output device 11 executes the steps S01 to S07 based on the hardware control command S11. In this case, in the step S01, based on the generated times of the hardware control command S11 and the hardware control command S21, the input output device 11 sequentially accumulates and stores the hardware control command S11 and the hardware control command S21 in the memory module 114, and the hardware control command S11 and the hardware control command S21 are further integrated as a control command list comprising a plurality of integrated control commands S12 which are listed in order and based on the generated times of the commands. In this embodiment, the hardware control command S21 is generated later than the hardware control command S11. Therefore, after the first processing module 111 reads and executes the integrated control command S12 corresponding to the hardware control command S11, the first processing module 111 then reads the integrated control command S12 stored in the memory module 114, where the integrated control command S12 corresponds to the hardware control command S21, and the first processing module 111 obtains the hardware control data S13a from the integrated control command S12 and updates the hardware control data S13a to the database 115. In the case that the hardware control data S13b and the hardware control data S13a are related to setting parameters of a same function of the hardware 3 and a same control object, then the hardware control data S13a obtained from the hardware control command S21 overwrites the hardware control data S13b obtained from the hardware control command S11 stored in the database 115 and the database 124, and the hardware control data S13a is updated to replace the hardware control data S13b in the database 115 and the database 124. In the case that the hardware control data S13b and the hardware control data S13a are related to setting parameters of different functions of the hardware 3 or different control objects, then the hardware control data S13b and the hardware control data S13a are together stored in the database 115 and the database 124. The second processing module 112 sets the control of the hardware 3 based on the hardware control data S13a stored in the database 115 to control the hardware 3 to operate based on the setting parameter currently corresponding to the hardware control data S13a.

In some embodiments, as shown in FIG. 1 and FIG. 2, the input output device 11 further comprises a third processing module 113. The third processing module 113 is coupled to the memory module 114. In other words, in this embodiment, the memory module 114 is coupled between the third processing module 113 and the first processing module 111. Moreover, the input output device 12 further comprises a fourth processing module 121. The fourth processing module 121 is coupled to the memory module 123. In other words, in this embodiment, the memory module 123 is coupled between the fourth processing module 121 and the database 124.

In the execution of the steps S08 to S09 (or step S10), or the steps S01 to S03, the controller 21 of the computer device 2 transmits the hardware control command S11 to the third processing module 113 of the input output device 11, and the controller 21 of the computer device 2 transmits the hardware control command S21 to the fourth processing module 121 of the input output device 12. The fourth processing module 121 receives the hardware control command S21 and transmits the hardware control command S21 to the third processing module 113 (step S10). The third processing module 113 receives the hardware control command S11 and the hardware control command S21 and transmits the hardware control command S11 and the hardware control command S21 to the memory module 114, and the hardware control command S11 and the hardware control command S21 are accumulated and stored as integrated control commands based on the generation times of the commands. Moreover, the database 115 comprises a plurality of addresses. Each of the addresses accesses a default access object and a setting parameter of the hardware control data for a default-controlled hardware type. For example, the default access object may be the first processing module 111, the second processing module 112, or other processing modules, and the default-controlled hardware type may be the hardware units of the hardware 3, such as the SSD, the LED lamp, the fan, or others. Based on the receiving order or based on the transmitted time of the control commands, the third processing module 113 accumulates and stores the hardware control command S11 and the hardware control command S21 transmitted by the computer device 2 or by the fourth processing module 121 of the input output device 12 in the memory module 114, so that the hardware control command S11 and the hardware control command S21 are integrated as a plurality of integrated control commands S12. Therefore, the first processing module 111 reads and executes the integrated control commands S12 based on the storing order of the integrated control commands S12 (that is, in this embodiment, the generated times of the hardware control command S11 and the hardware control command S21), and then the first processing module 111 obtains the setting parameters of the hardware control data S13a, S13b for setting the hardware 3 and stores the setting parameters of the hardware control data S13a, S13b in the database 115. Specifically, in this embodiment, based on the hardware types indicated by the integrated control commands S12, the first processing module 111 obtains the setting parameters of the corresponding hardware control data S13a, S13b and stores the parameters in an assigned address in the database 115, where the assigned address corresponds to the hardware type indicated by the integrated control commands S12. Therefore, the setting parameters in the database 115 are updated based on the hardware control data S13a, S13b which are stored in the assigned address of the plurality of addresses and correspond to integrated control commands S12. Hence, the second processing module 112 reads the current setting parameters of the hardware control data S13a, S13b corresponding to the hardware control commands S11, S21 for setting the control of the hardware 3 from the assigned address.

In some embodiments, after the fourth processing module 121 executes the step S10 based on the hardware control command S21, the fourth processing module 121 may also transmits the hardware control command S21 and stores the hardware control command S21 in the memory module 123. Therefore, in the case that the input output device 11 is not working or malfunctioned before the input output device 11 executes the step S06, which thus results that the hardware control data stored in the database 115 cannot be updated to the database 124, the input output processing module 12 can update the database 124 based on the hardware control command S21 stored in the memory module 123.

Figure 4:
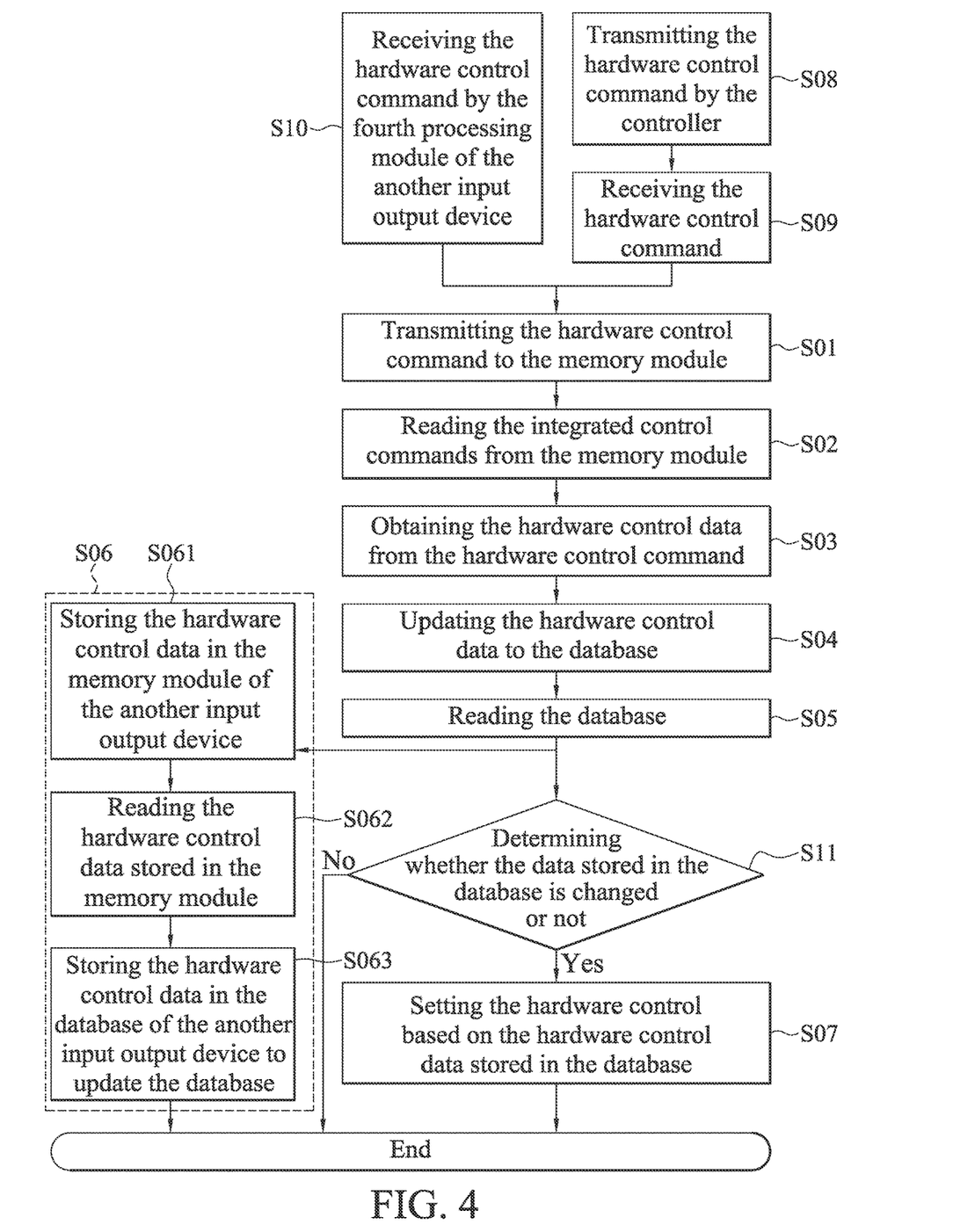
FIG. 4 illustrates a flowchart of an input output device of an integrated control management system according to another exemplary embodiment of the instant disclosure.

In some embodiments, the input output device 12 further comprises a fifth processing module 122 and a sixth processing module 125. The sixth processing module 125 is coupled to the database 124, and the fifth processing module 122 is coupled between the memory module 123 and the database 124. After the input output device 11 receives the hardware control command S11 transmitted by the computer device 2, or receives the hardware control command S21 transmitted by the input output device 12, or receives both the hardware control command S11 transmitted by the computer device 2 and the hardware control command S21 transmitted by the input output device 12, the input output device 11 accumulates and stores the hardware control commands S11, S21 in the memory module 114 (step S01), and the input output device 11 accumulates and stores the hardware control commands S11, S21 in the control command list comprising a plurality of integrated control commands S12. Next, the first processing module 111 reads the control command list comprising the plurality of integrated control commands S12 and transmits the hardware control data S13$a$, S13$b$ of the integrated control commands S12 in the control command list to the second processing module 112. Further, as shown in FIG. 4, in the step S06, the second processing module 112 further transmits the hardware control data S13$a$, S13$b$ of the integrated control commands S12 in the control command list to the input output device 12, such that the hardware control data S13$a$, S13$b$ are stored in the memory module 123 of the input output device 12 (step S061). Specifically, in this embodiment, the first processing module 111 periodically transmits the control command list comprising the hardware control data S13$a$, S13$b$ from the memory module 114 to the input output device 12 through the second processing module 112 to overwrite the backup of the control command list stored in a command backup address of the memory module 123. Specifically, in this embodiment, after the sixth processing module 125 of the input output device 12 receives the control command list from the second processing module 112, the sixth processing module 125 transmits the control command list to the fourth processing module 121, so that the control command list is backed up and stored in a command backup address of the memory module 123. In one embodiment, the first processing module 111 delete a hardware control command S21 stored in the memory module 114 of input output device 11 after the second processing module 112 transmits hardware control data S13$a$, S13$b$ corresponding to the hardware control command S21; therefore, the control command list sent by the second processing module 112 overwrites the originally saved control command list in the memory module 123. In the case that the input output device 12 detects that the input output device 11 operates abnormally, the input output device 12 is automatically switched to be operated as an active type input output device, and the fourth processing module 121 integrates a plurality of integrated control commands S22 in the control command list stored in the command backup address and a plurality of integrated control commands S22 originally stored in the memory module 123 to form another control command list based on the generation times of the commands. The fifth processing module 122 of the input output device 12 reads the integrated control commands S22 from the memory module 123 and executes the hardware control data S13$a$, S13$b$ of the integrated control commands S22 (step S062). Because the control command list is generated based on the generation time of the commands, the same hardware control commands, which have the same generation time, would not be saved and executed repeatedly. Through the execution of the control command list of the plurality of integrated control commands S22, the fifth processing module 122 obtains the hardware control data S13$a$, S13$b$ in the integrated control commands S22 and stores the hardware control data S13$a$, S13$b$ in the database 124 of the input output device 12 to update the database 124 (step S063). The setting parameters of the new hardware control data S13$a$, S13$b$ thus overwrites the setting parameters of the hardware control data originally stored in the database 124. In another embodiment, the second processing module 112 transmits the received control command list to the sixth processing module 125 of the input output device 12, the sixth processing module 125 transmits the received control command list to the fifth processing module 122, and the fifth processing module 122 stores the received control command list in the command backup address of the memory module 123.

In some embodiments, after the step S05 is executed, the second processing module 112 reads the database 115 to determine whether the setting parameters of the hardware control data stored in the database 115 is changed or not (step S11). When the hardware control data is changed, for example, when the new setting parameters (e.g. the hardware control data S13$a$) overwrite the setting parameters of the hardware control data originally stored in database 115 (that is, in this embodiment, when the second processing module 112 determines that the data stored in the database 115 is changed (the determination result is "yes")), the second processing module 112 then executes the step S07 based on the setting parameters of the current hardware control data (e.g. the hardware control data S13$a$). When the second processing module 112 determines that the data stored in the database 115 is not changed (the determination result is "no"), the second processing module 112 does not execute the step S07.

In some embodiments, whether the hardware control data stored in the database 115 is changed or not, the input output devices 11, 12 may execute the step S06 periodically based on a preset time. The preset time is adjustable, so that the hardware 3 can be controlled by the input output devices 11, 12 periodically based on the hardware control data currently stored in the database 115. In some other embodiments, after the step S04 is executed, the input output devices 11, 12 may execute the step S06 when the new setting parameters overwrite the setting parameters of the hardware control data originally stored in database 115 (that is, in this embodiment, when the second processing module 112 determines that the data stored in the database 115 is changed).

In some embodiments, for example, the database 115 of the input output device 11 stores a first hardware control data for controlling the SSD (the control object is the SSD, the controlling function is turn off, and the default control data is "0"). When the user tends to turn on the power of the SSD, based on the operation of the computer device 2 by the user, based on the currently executing program of the computer device 2, or based on the triggering of other signals to the computer device 2, the controller 21 transmits the hardware control command S21 for turning on the power of the SSD to the fourth processing module 121 of the input output device 12 (the steps S08 and S09). Then, the fourth processing module 121 transmits the hardware control command S21 for turning on the power of the SSD to the input output device 11, so that the memory module 114 stores the hardware control command S21 as one of the integrated control commands S12 (step S01). Next, the first processing module 111 reads the integrated control commands S12 for turning on the power of the SSD from the memory module 114 (step S02) and obtains the hardware control data S13$a$ for turning on the power of the SSD and having the setting parameter as "1" (step S03). The first processing module 111 then updates the setting parameter of the hardware control data S13$a$ to be "1" in the database 115, and the setting parameter "0" of the hardware control data originally stored in the database 115 is thus overwritten by the setting parameter "1" of the hardware control data S13$a$ (step S04). The second processing module 112 then reads the setting parameter "1" of the hardware control data for setting the SSD power currently stored in the database 115 (step S05), and the second processing module 112 updates the setting parameter "1" of the hardware control data to the input output device 12, so that the input output device 12 stores the setting parameter "1" of the hardware control data in the database 124 (step S06). Moreover, when the second processing module 112 determines that the setting parameter of the hardware control data for setting the SSD power stored in the database 115 is changed from "0" to "1" (step S11), the second processing module 112 controls the power of the SSD to be turned on based on the setting parameter "1" of the hardware control data for setting the power of the SSD currently stored in the database 115 (step S07).

In some embodiments, the memory modules may be virtual memories, the third processing module 113 and the fourth processing module 121 may be representational state transfer application program (RESTful) interfaces, and the first processing module 111, the second processing module 112, and the fifth processing module 122 may be multi-thread processors or microcontrollers. In some other embodiments, each of the first processing module 111, the second processing module 112, and the third processing module 113 is one of a plurality of firmware modules of a firmware executed by the input output device 11, and each of the fourth processing module 121, the fifth processing module 122, and the sixth processing module 126 is one of a plurality of firmware modules of another firmware executed by the input output device 12.

Based on the above, according to one or some embodiments of the instant disclosure, through configuring two input output devices respectively as an active type input output device and a passive type input output device, whether the active type input output device or the passive type input output device receives the hardware control command, the system consistently controls the operation of the hardware through the active type input output device and performs the backup procedure in the passive type input output device. Therefore, through the cooperation between the active type input output device and the passive type input output device, the active type input output device is provided for executing the control of the hardware to prevent that the hardware from being controlled by two input output device at the same time which thus cause the setting of the hardware to be improper and unstable. Moreover, the passive type input output device is provided for executing the backup procedure. Therefore, when the active type input output device cannot operated, the passive type input output device can be switched to control the hardware, so that the user can subsequently control the hardware based on the data backed up to the passive type input output device.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An integrated control management system, adapted to set a hardware control, wherein the integrated control management system comprises an input output device, and the input output device comprises:
   a database;
   a memory module adapted to receive and store a plurality of integrated control commands, wherein one of the integrated control commands is a hardware control command for setting the hardware control transmitted by another input output device;
   a first processing module coupled to the memory module and the database, wherein the first processing module is adapted to read the hardware control command of the integrated control commands from the memory module to obtain a hardware control data from the hardware control command; the first processing module updates the hardware control data to the database;
   a second processing module coupled to the database, wherein the second processing module is adapted to read the database and update the hardware control data stored in the database to another database of the another input output device; the second processing module sets the hardware control based on the hardware control data stored in the database; and
   a third processing module coupled to a controller and the memory module, wherein the third processing module is adapted to receive another hardware control command transmitted by the controller after the another input output device transmits the hardware control command and to transmit the another hardware control command to the memory module;
   wherein the memory module stores the another hardware control command; another one of the integrated control commands is the another hardware control command; the first processing module reads the another hardware control command of the integrated control commands from the memory module and obtains another hardware control data from the another hardware control command; the first processing module updates the another hardware control data to the database, and the another hardware control data overwrites the hardware control data; the second processing module reads the database and updates the another hardware control data stored in the database to another database of the another input output device, and the second processing module sets the hardware control based on the another hardware control data stored in the database; and
   wherein the memory module further stores a control command list the control command list comprises the integrated control commands; the hardware control command and the another hardware control command of the integrated control commands are sequentially accumulated and stored in the hardware control list according to generated times of the hardware control command and the another hardware control command.

2. The integrated control management system according to claim 1, wherein,
   when the first processing module determines that the another hardware control data and the hardware control data stored in the database are related to setting parameters of a same hardware function and a same control object, the another hardware control data overwrites the hardware control data; and
   when the first processing module determines that the another hardware control data and the hardware control data stored in the database are related to setting parameters of different hardware functions and different control objects, the another hardware control data and the hardware control data are together stored in the database.

3. The integrated control management system according to claim 1, wherein a fourth processing module of the another input output device receives the hardware control command and transmits the hardware control command to the third processing module; the third processing module stores the hardware control command to an assigned address of the memory module, and the first processing module reads the hardware control command of the integrated control command from the memory module based on the assigned address; after the fourth processing module receives the hardware control command, the fourth processing module stores the hardware control command in another memory module of the another input output device.

4. The integrated control management system according to claim 1, wherein,
when the first processing module determines that the hardware control data and the another hardware control data stored in the database are related to setting parameters of a same hardware function and a same control object, the hardware control data overwrites the another hardware control data; and
when the first processing module determines that the hardware control data and the another hardware control data stored in the database are related to setting parameters of different hardware functions and different control objects, the hardware control data and the another hardware control data are together stored in the database.

5. The integrated control management system according to claim 1, wherein the third processing module of the input output device receives the hardware control command; the third processing module stores the hardware control command to an assigned address of the memory module, and the first processing module reads the hardware control command of the integrated control command from the memory module based on the assigned address.

6. The integrated control management system according to claim 1, wherein the second processing module reads the hardware control data stored in the database; the second processing module stores the hardware control data as a plurality of integrated control commands of another memory module of the another input output device; one of the integrated control commands of the another memory module is the hardware control data; a fifth processing module of the another input output device reads the hardware control data from the another memory module; the fifth processing module stores the hardware control data in another database of the another input output device to update the another database.

7. The integrated control management system according to claim 1, wherein the second processing module reads the database to determine whether a data stored in the database changes or not; when the hardware control data overwrites the data stored in the database and the second processing module determines that the data stored in the database is changed, the second processing module sets the hardware control based on the hardware control data stored in the database.

8. The integrated control management system according to claim 7, wherein when the hardware control data overwrites the data stored in the database and the second processing module determines that the data stored in the database is not changed, the second processing does not set the hardware control.

9. The integrated control management system according to claim 7, wherein when the hardware control data overwrites the data stored in the database and the second processing module determines that the data stored in the database is changed, the second processing module updates the hardware control data stored in the database to another database of the another input output device.

10. An integrated control management system adapted to set a hardware control, wherein the integrated control management system comprises an input output device, and the input output device comprises:
a database;
a memory module adapted to receive and store a plurality of integrated control commands, wherein one of the integrated control commands is a hardware control command for setting the hardware control transmitted by a controller;
a first processing module coupled to the memory module and the database, wherein the first processing module is adapted to read the hardware control command of the integrated control commands to obtain a hardware control data from the hardware control command; the first processing module updates the hardware control data to the database;
a second processing module coupled to the database, wherein the second processing module is adapted to read the database and update the hardware control data stored in the database to another database of another input output device; the second processing module sets the hardware control based on the hardware control data stored in the database; and
a third processing module coupled to the controller and the memory module, wherein the third processing module is adapted to receive another hardware control command transmitted by the another input output device after the controller transmits the hardware control command and to transmit the another hardware control command to the memory module;
wherein the memory module stores the another hardware control command; another one of the integrated control commands is the another hardware control command; the first processing module reads the another hardware control command of the integrated control commands from the memory module and obtains another hardware control data from the another hardware control command; the first processing module updates the another hardware control data to the database, and the another hardware control data overwrites the hardware control data; the second processing module reads the database and updates the another hardware control data stored in the database to another database of the another input output device, and the second processing module sets the hardware control based on the another hardware control data stored in the database; and
wherein the memory module further stores a control command list the control command list comprises the integrated control commands; the hardware control command and the another hardware control command of the integrated control commands are sequentially accumulated and stored in the hardware control list according to generated times of the hardware control command and the another hardware control command.

11. The integrated control management system according to claim 10, wherein
the third processing module of the input output device receives the hardware control command;
the third processing module stores the hardware control command to an assigned address of the memory module; and
the first processing module reads the hardware control command of the integrated control command from the memory module based on the assigned address.

12. The integrated control management system according to claim 10, wherein the second processing module reads the hardware control data stored in the database; the second processing module stores the hardware control data as a plurality of integrated control commands of another memory module of the another input output device; one of the integrated control commands of the another memory module is the hardware control data; a fifth processing module of the another input output device reads the hardware control data from the another memory module; the fifth processing module stores the hardware control data in another database of the another input output device to update the another database.

13. The integrated control management system according to claim 10, wherein the second processing module reads the database to determine whether a data stored in the database changes or not; when the hardware control data overwrites the data stored in the database and the second processing module determines that the data stored in the database is changed, the second processing module sets the hardware control based on the hardware control data stored in the database.

14. The integrated control management system according to claim 13, wherein when the hardware control data overwrites the data stored in the database and the second processing module determines that the data stored in the database is not changed, the second processing does not set the hardware control.

15. The integrated control management system according to claim 13, wherein when the hardware control data overwrites the data stored in the database and the second processing module determines that the data stored in the database is changed, the second processing module updates the hardware control data stored in the database to another database of the another input output device.

16. An integrated control management system adapted to set a hardware control, wherein the integrated control management system comprises:
 an input output device comprising:
  a database;
  a memory module adapted to receive and store a plurality of integrated control commands, wherein one of the integrated control commands is a hardware control command;
  a first processing module coupled to the memory module and the database, wherein the first processing module is adapted to read the hardware control command of the integrated control commands to obtain a hardware control data from the hardware control command; the first processing module updates the hardware control data to the database;
  a second processing module coupled to the database, wherein the second processing module is adapted to read the database to transmit the hardware control data; the second processing module sets the hardware control based on the hardware control data; and
  a third processing module coupled to the memory module, wherein the third processing module is adapted to receive the hardware control command and transmit the hardware control command to the memory module; and
 another input output device comprising:
  another database;
  a fourth processing module adapted to receive the hardware control command from a controller and transmit the hardware control command to the third processing module; the third processing module stores the hardware control command in the memory module;
  another memory module coupled to the fourth processing module, wherein the another memory module is adapted to store the hardware control data transmitted by the second processing module as a plurality of integrated control commands of the another memory module; one of the integrated control commands of the another memory module is the hardware control data; and
  a fifth processing module coupled to the another memory module, wherein the fifth processing module is adapted to read the hardware control data from the another memory module; the fifth processing module updates the hardware control data to the another database,
 wherein the third processing module receives another hardware control command for setting the hardware control transmitted by the controller; the third processing module stores the another hardware control command in the memory module; another one of the integrated control commands in the memory module is the another hardware control command; the first processing module reads the another hardware control command and obtains another hardware control data from the another hardware control command; the first processing module updates the another hardware control data to the database; the second processing module reads the database to store the another hardware control data in the another memory module of the another input output device, and the second processing module sets the hardware control based on the another hardware control data; the fifth processing module reads the another hardware control data to update the another hardware control data to the another database;
 wherein the memory module further stores a control command list the control command list comprises the integrated control commands; the hardware control command and the another hardware control command of the integrated control commands are sequentially accumulated and stored in the hardware control list according to generated times of the hardware control command and the another hardware control command.

\* \* \* \* \*